US008606733B2

(12) United States Patent
Marchesotti et al.

(10) Patent No.: US 8,606,733 B2
(45) Date of Patent: Dec. 10, 2013

(54) SYSTEM AND METHOD FOR CLASSIFICATION AND SELECTION OF COLOR PALETTES

(75) Inventors: Luca Marchesotti, Grenoble (FR); Marco Bressan, Grenoble (FR)

(73) Assignee: Xerox Corporation, Norwalk, CT (US)

(*) Notice: Subject to any disclaimer, the term of this patent is extended or adjusted under 35 U.S.C. 154(b) by 698 days.

(21) Appl. No.: 12/632,107

(22) Filed: Dec. 7, 2009

(65) Prior Publication Data

US 2011/0135195 A1    Jun. 9, 2011

(51) Int. Cl.
*G06N 5/00* (2006.01)
*G09G 5/02* (2006.01)

(52) U.S. Cl.
USPC ............................................. 706/45; 345/589

(58) Field of Classification Search
USPC ............................................. 706/45; 345/589
See application file for complete search history.

(56) References Cited

U.S. PATENT DOCUMENTS

| | | | |
|---|---|---|---|
| 5,642,137 A | 6/1997 | Kitazumi | |
| 6,466,274 B1 | 10/2002 | White | |
| 7,324,119 B1 | 1/2008 | Puri et al. | |
| 2002/0167527 A1 | 11/2002 | Senn et al. | |
| 2003/0146925 A1 | 8/2003 | Zhao et al. | |
| 2004/0164991 A1 | 8/2004 | Rose | |
| 2006/0066629 A1 | 3/2006 | Norlander et al. | |
| 2009/0031882 A1 | 2/2009 | Kemp et al. | |
| 2009/0073465 A1 | 3/2009 | Rolleston et al. | |
| 2009/0141983 A1* | 6/2009 | Bing et al. | ............ 382/195 |

OTHER PUBLICATIONS

Sato et al ("Emotional Extraction System by Using the Color Combination" 2005).*
Li et al ("Affective Space Exploration for Impressionism Paintings" PCM 2008).*
Wei et al ("Color-Mood Analysis of Films Based on Syntactic and Psychological Models" 2004).*
Chen et al ("A Color Set Web-Based Agent System for 2-Dimension Emotion Image Space" 2008).*
Papachristos et al ("Inferring Relations Between Color and Emotional Dimensions of a Web Site Using Bayesian Networks" 2005).*
Sato et al ("Designing of the Color KANSEI Information Map Considering the Individual Characteristic by Using Multivariable Analysis" 2006).*
Le et al ("A Color Coordination Support System based on Color Image" 2006).*
Lee et al ("Color Your Feeling Design Support System for Color Coordination" 2004).*
Bentivogli, et al., Revising WordNet Domains Hierarchy: Semantics, Coverage and Balancing, *Proc. Of COLING 2004 Workshop on Multilingual Linguistic Resources*, Geneva Switzerland, pp. 101-108, Aug. 28, 2004.

(Continued)

*Primary Examiner* — Lut Wong
(74) *Attorney, Agent, or Firm* — Fay Sharpe LLP

(57) ABSTRACT

A system and method for categorizing color palettes are provided. A taxonomy for a particular type of achromatic entity, such as emotions, is generated and populated with a list of terms. Natural language terms extracted from annotated color palettes are associated with the corresponding achromatic entity categories in the taxonomy. Features are extracted from the color palettes. The features, together with the category information, are used to train a classifier which is then able to assign achromatic entities to palettes outside the training set, based on extracted features.

24 Claims, 5 Drawing Sheets

(56) References Cited

OTHER PUBLICATIONS

Chen, et al., Emotion-Based Music Visualization Using Photos, *Intl. Multimedia Modeling Conf. (MMM)* 2008.

COLOURlovers, *Color Trends & Palettes*, available at: http://www.colourlovers.com, downloaded Jun. 2, 2009.

Cowie, Emotion-Oriented Computing: State of the Art and Key Challenges, *Humaine. Network of Excellence* (2005).

Dellaert, et al., Recognizing Emotion in Speech, *Proc. of the ICSLP*, 1996.

U.S. Appl. No. 12/464,212, filed May 12, 2009, Rolleston, et al.

Erickson, et al., Articulatory Characteristics of Emotional Utterances in Spoken English, *Proceedings of the ICSLP*, 2000 (Abstract).

Esuli, et al., Sentiwordnet: A Publicly Available Lexical Resource for Opinion Mining, *Proc. of 5th Conf on LREC*, Genova, IT, pp. 417-422, 2006.

Fellbaum, WordNet: An Electronic Lexical Database, *MIT Press*, 422 p. (1998) (Book Description, available at www.dsoergel.com/cv/C19.pdf, downloaded Dec. 7, 2009).

Harrower, et al., ColorBrewer: An Online Tool for Selecting Color Schemes for Maps, *The Cartographic Journal* 40(1):27-37 (2003).

Jain, et al., Color Match: An Imaging Based Mobile Cosmetics Advisory Service, *Proc. Of the 10th Intl. Conf. on Human-Computer Interaction with Mobile Devices and Services*, Amsterdam The Netherlands, Sep. 2-5, 2008.

Joachims, $SVM^{light}$ Support Vector Machine, Cornell University, Nov. 1999, available at: http://www.cs.cornell.edu/People/tj/svm_light/ and http://svmlight.joachims.org/.

Lu, et al., Automatic Mood Detection and Tracking of Music Audio Signals, *IEEE Transactions on Audio, Speech & Language Processing*, 14(1)5-18 (2006) (Abstract).

Magnini, et al., Integrating Subject Field Codes into WordNet, *Proc. Of LREC-2000, 2nd Intl. Conf. on Language Resources and Evaluation*, Gavrilidou, Crayannis, Markantonatu, Piperidis, and Stainhaouer (Eds.), Athens, Greece, pp. 1413-1418, May 31 to Jun. 2, 2000.

Marchesotti, et al., Initial User Requirements, *OMNIA Project*, Jul. 2008.

Marszalek, et al., Semantic Hierarchies for Visual Object Recognition, *CVPR*, 2007.

Meier, et al., Interactive Color Palette Tools, *Journal IEEE Computer Graphics and Applications*, vol. 24, No. 3, pp. 64-72 (2004).

Mihalinec, et al., Emotion Recognition and Its Aesthetic Interpretation, *ELMAR/Computer Vision in Art*, Mislav Grgić(Ed.). Zadar:Elmar, pp. 302-307, 2008.

Moroney, The Opposite of Green Is Purple, *HP Labs*, HPL-2009-60, Mar. 2009.

Oicherman, et al., Kansei Imaging: First Steps, *HP Labs*, HPL-2009-12, Feb. 2009.

Papachristos, et al., Inferring Relations Between Color and Emotional Dimensions of a Web Site Using Bayesian Networks, *INTERACT* 2005, LNCS 3585, pp. 1075-1078, 2005.

Schröder, et al., Developing a Consistent View on Emotion-Oriented Computing, *Machine Learning for Multimodal Interaction*, pp. 194-205, Springer LNCS 3869, 2006.

Tellegen, et al., On the Dimensional and Hierarchical Structure of Affect, *Psychological Science*, vol. 10, No. 4 (Jul. 1999) (Abstract).

Van De Laar, Emotion Detection in Music, A Survey, *Twente Student Conf. on IT*, 1:700, 2006.

Voong, Music Organisation Using Colour Synaesthesia, *CHI Experience Report* (2007).

Wei, et al., Color-Mood Analysis of Films Based on Syntactic and Psychological Models, *Proc. of the 2004 IEEE Intl. Conf. on Multimedia and Expo, ICME* 2004, Taipei, Taiwan, Jun. 27-30, 2004.

Wu, et al., Regrouping of Expressive Terms for Musical Qualia, *Workshop on Computer Music and Audio Technology (WOCMAT)*, (2007).

Yu, et al., Emotion Detection From Speech to Enrich Multimedia Content, *Proc. of the 2nd IEEE Pacific Rim Conf. on Multimedia*, Peking, pp. 550-557 (2001).

\* cited by examiner

SYSTEM AND METHOD FOR CLASSIFICATION AND SELECTION OF COLOR PALETTES

BACKGROUND

The exemplary embodiment relates to color selection. It finds particular application in connection with a system and method for classification and selection of color palettes based on an achromatic taxonomy.

A color palette is a set of different colors, which may be displayed as an ordered or unordered sequence of swatches, one for each color in the set. The colors in the palette have typically been selected by a graphic designer, or other skilled artisan working with color, to harmonize with each other, when used in various combinations. The effect of different color palettes on the human perception of the objects to which the colors are applied, such as brochures, textiles, automobiles, and the like, is not fully understood. However, either through common usage or innate preferences, the selection of a color palette can influence a customer's perception of an object. For example a brochure advertising Mediterranean vacations which utilizes a set of muted hues may be less likely to draw the interest of a customer than one which uses the bright colors typically associated with the region. Accordingly, designers often wish to select a color palette which is associated, in human perception, with a certain achromatic entity, such as an emotion, geographical location, musical genre, seasons of the year, or the like. In the case of emotions, palettes which elicit an excited or enthusiastic emotion may be suitable for some applications, such as a flyer for a circus production, while for others, such as a food product, the designer may wish to elicit emotions of pleasantness, such as contented or warm-hearted emotions. The designer uses his or her acquired experience in selecting a suitable color palette for the particular application.

Increasingly, color palettes are used by those who do not have extensive experience in color selection and design. To ascertain the response of a wide variety of people to a particular color palette, the palette may be submitted for review. Users look at the palettes, e.g., displayed on a screen or printed on print media, and assign labels which are natural language expressions of the particular users' perceptions. Large collections of labelled data where millions of users create, annotate, and review color combinations are now accessible.

The present exemplary embodiment takes advantage of such labelled data in a system and method which enables selection and creation of palettes according to achromatic entities, such as emotions.

INCORPORATION BY REFERENCE

The following references, the disclosures of which are incorporated herein by reference in their entireties, are mentioned.

U.S. Pub. No. 2009/0073465, published Mar. 19, 2009, entitled NATURAL LANGUAGE COLOR COMMUNICATION AND SYSTEM INTERFACE, by Rolleston, et al., discloses a method and system for controlling color output. The method includes receiving a document containing a color image, producing a first output copy of the document using a first color processing path, receiving at least one natural language request to adjust the color output of the device, adjusting the color output of the device, and producing a second output copy of the document. The method and system further includes presenting natural language descriptions of the effects of color processing paths with or without sample palettes to the user either to solicit a suggestion from the user or present the user with choices based upon the natural language request received.

U.S. Pub No. 2003/0146925, published Aug. 7, 2003, entitled GENERATING AND USING A COLOR PALETTE, by Jun Zhao, et al., discloses a method and apparatus for generating a color palette having m colors from a color image described in a color space. The method includes obtaining pixel image data corresponding to the color image, determining a frequency of occurrence for each color in the pixel image data, assigning each color in the pixel image data to one of a predetermined number of cells into which the color space has been partitioned, the predetermined number being not greater than m, a first selecting step of selecting the most commonly occurring color in each cell in which a color exists, so as to obtain n palette colors, calculating a vote value for each unselected color, the vote value being based at least in part on the frequency of occurrence of the color in the pixel image and a weighting factor based on a rank of the color in its corresponding cell, the unselected colors being the colors not selected in the first selecting step; and a second selecting step of selecting m–n colors as the unselected colors with the highest vote values.

U.S. Pub No. 2009/0031882, published Feb. 5, 2009, entitled METHOD FOR CLASSIFYING MUSIC, by Thomas Kemp, et al., discloses a method for classifying music. Mood values may be chosen to classify the moods "happy," "sad," and "aggressive," respectively, with respect to the piece of music. In other embodiments, two-dimensional coordinate values, in normalized form, a color or color values describing a color are generated which are descriptive for the mood of the piece of music.

U.S. Pub. No. 2002/0167527, published Nov. 14, 2002, entitled PROCESS FOR THE PRODUCTION OF A COLOR PALETTE, by Thomas Senn, et al., discloses a system and method for producing a color palette including a multitude of color patterns for a predetermined coloring process with a multitude of defined base colors and for a predetermined substrate.

U.S. Pub. No. 2006/0066629, published Mar. 30, 2006, entitled SYSTEM AND METHOD FOR COLOR SELECTION, by Rebecca Norlander, et al., discloses a system and method for color management. The system may include stored color palettes and a structured color picker for selecting color choices from the color palettes. The structured color picker may include a set of colorist theory rules for facilitating selection of harmonious colors from the color palettes. A user may input an image having a preferred color combination in order to create a desirable color palette. A user interface wizard may also be provided for allowing user to select a color palette or particular colors within the color palette. The color picker may expose the harmonious colors to the user through the user interface wizard. Furthermore, the color management system enables adjustment of selected colors based on user color deficiency.

U.S. Pat. No. 6,466,274, issued Oct. 15, 2002, entitled SYSTEM AND METHOD FOR COLOR PALETTE TRANSLATION, by Brian K. White, discloses a process for translating a source palette containing TV unsafe colors into a resultant modified palette containing only TV safe colors, while preserving the color trends in the source palette.

U.S. Pat. No. 7,324,119, issued Jan. 29, 2008, entitled RENDERING COLOR IMAGES AND TEXT, by Atul K. Puri, et al., discloses techniques for configuring a document for display in a display environment. The techniques include generating a document color palette, where the colors of the document color palette are selected based on colors of a plurality of color containing objects in the document, and generating a plurality of views of the document, two or more of the views being based on different color palettes.

U.S. Pat. No. 5,642,137, issued Jun. 24, 1997, entitled COLOR SELECTING METHOD, by Kitazumi, discloses a method for color selection. Color palettes for designating colors of a digitized color image are formed by selecting a predetermined number of colors from a large number of selectable colors and by allocating the so-selected colors to respective palette numbers.

U.S. Pub. No. 20100293458, published Nov. 18, 2010, entitled COLOR MANAGEMENT SYSTEM AND METHOD USING NATURAL LANGUAGE DESCRIPTION OF COLOR DIFFERENCES, by Robert J. Rolleston, et al. relates to a color management system.

U.S. Pub. No 2004/0164991, published Aug. 26, 2004, entitled COLOR PALETTE PROVIDING CROSS-PLATFORM CONSISTENCY, by Brian Rose, discloses a method and system to provide a color palette which facilitates user selection of web-safe colors. In laying out the color palette, the extent of achromatic colors located within the color palette is determined.

BRIEF DESCRIPTION

In accordance with one aspect of the exemplary embodiment, a method of categorizing color palettes is provided. The method includes associating natural language terms with achromatic entity categories of a set of achromatic entity categories. Entity categories from the set of achromatic entity categories are assigned to labeled color palettes in a dataset of color palettes based on matching natural language terms in the labels of the color palettes with the natural language terms associated with the achromatic entity categories, each color palette comprising a plurality of different colors, extracting color-related features from each of the color palettes, and, with a computer processor, and based on the assigned entity categories and color related features of the labeled color palettes, training a classifier to categorize a color palette into at least one of the set of achromatic entity categories based on its extracted color-related features.

In accordance with another aspect of the exemplary embodiment, a color palette system includes a taxonomy stored in memory comprising a set of achromatic entity categories and a set of natural language terms associated with each of the achromatic entity categories. A dataset of color palettes is stored in memory, each color palette comprising a plurality of different colors, at least a subset of the color palettes being annotated with labels that each include at least one natural language term from the taxonomy. A classifier is stored in memory which assigns achromatic entity categories to color palettes, the classifier having been trained on color-related features extracted from labeled color palettes of the subset of the color palettes and achromatic entities assigned based on the natural language terms in their labels. Instructions are stored in memory for inputting color-related features extracted from a color palette into the classifier and for associating one or more achromatic entity categories assigned by the classifier to that color palette. A processor in communication with the memory executes the instructions.

In another aspect, a method for palette classification includes mining, with natural language processing tools, a collection of color palettes which have been manually annotated with descriptive labels to identify a training set of palettes with labels which include one of a predetermined set of natural language terms, the natural language terms in the set each being assigned to one of a set of achromatic entity categories. For each identified palette in the training set, the method includes generating a palette descriptor which represents the colors in the palette and, with a computer processor, training a classifier with color-related features extracted from the palette descriptors and achromatic entity categories of the terms included in the labels. Color palettes in the collection which are not in the training set are classified with the classifier based on color-related features extracted from their respective palette descriptors.

DETAILED DESCRIPTION

Figure 1:
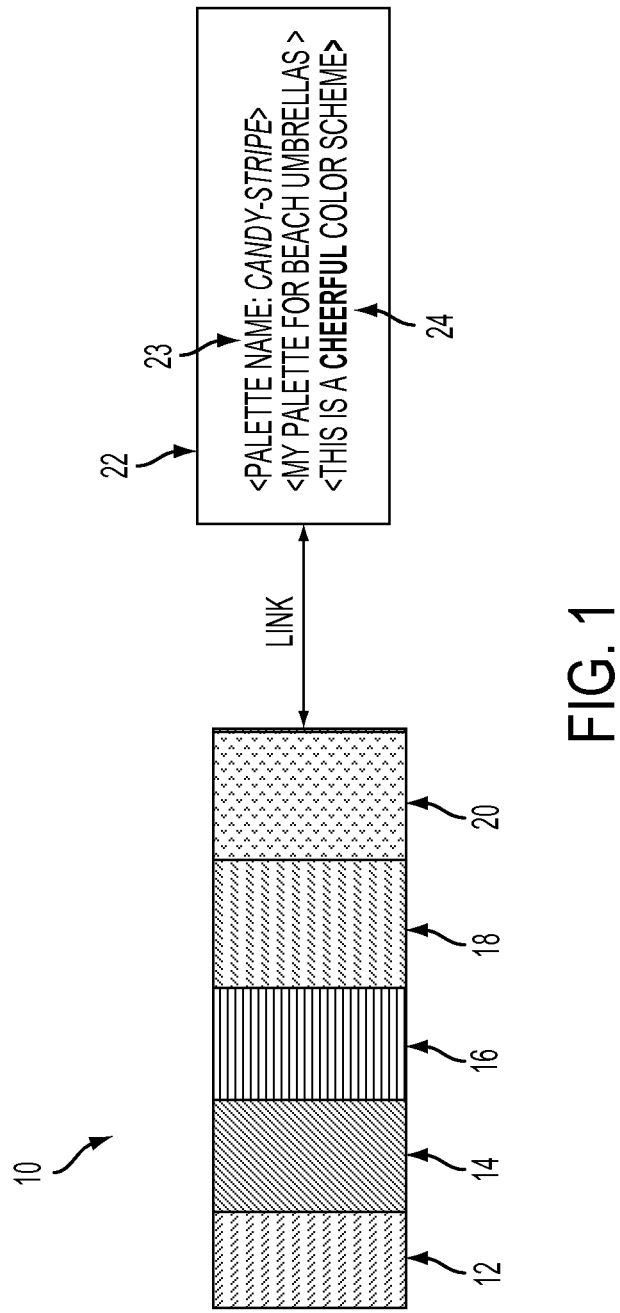
FIG. 1 illustrates an exemplary labeled color palette.

The exemplary embodiment provides a system and method for associating color combinations (color palettes) with achromatic entities, such as emotions, music genres, geographic locations, and the like. By "achromatic," it is meant that the entity is not directly related to color. The achromatic entities are thus not associated with any particular color or set of colors. However, as described herein, achromatic entities can be associated with color palettes through a learned classifier model which takes, as input, color palettes labelled (annotated) with terms that are evocative of achromatic entities.

The term "color" is used to refer to any aspect of color which may be specified, including, but not limited to, statistics about absolute color values, such as hue, chroma, and lightness, and relative color values, such as differences in hue, chroma, and lightness. Color can be expressed, for example, in a three or more coordinate color space, such as RGB, $L^*$, $a^*$, $b^*$, YCbCr, Luv, XYZ, CMYK, etc. Color, as used herein, is not limited to chromatic colors but also includes black and white.

Each color palette includes a plurality of visually different colors (which can be shown visually as a set of swatches), such as at least three, at least four, or at least five different colors, and may include up to 50, e.g., up to 20 different colors, i.e., fewer than all colors which can be represented in the selected color space. For example, in an 8 bit RGB space, there are 256×256×256 possible colors. An RGB color palette includes only a fraction of these colors, e.g., less than 1%, such as less than 0.1% or less than 0.01% of the possible colors. Each color palette color may be expressed in terms of colorant values, such as grayscale values, for each of a set of color separations, such as $L^*a^*b^*$ or RGB, etc. or be expressed in another other color space in which different colors can be represented. In general, "grayscale" refers to the optical density value of any color channel, however expressed (e.g., $L^*a^*b^*$, RGB, YCbCr, etc.). Each color palette in a dataset of color palettes may differ from all others with respect to at least one of its swatches (colors).

Achromatic entities can be of any type, such as emotions, geographic locations, music genres, and the like. While the exemplary embodiment, the entities are described with particular reference to emotions, it is to be appreciated that other types of entity can be similarly treated. The method and system assume that a set of entity categories of the same entity type (e.g., of type-emotions) can be defined into which color palettes can each be assigned to a respective entity category, based on a term (e.g., a word or phrase) with which the palette is labeled. The terms (also referred to as keywords) can themselves be entities or words/phrases closely associated with the entity categories. While the set of categories can be selected to encompass all entities of a particular entity type, e.g., all emotions, in other embodiments, the categories are more narrowly defined. For example, in the case of geographic locations, the entity categories may consist solely of European countries, or solely of the states in the United States. Other, more unique categories may be envisaged, such as wine growing regions, or land type regions, such as farmland, forest, urban, arctic, and desert regions. In the case of music genres, broad categories of music genre, such as jazz, classical, rock, country, hip hop, and popular music, may be selected as entity categories.

FIG. 1, by way of example, illustrates an exemplary color palette 10 in which swatches 12, 14, 16, 18, 20 are of different colors (represented herein by differences in shading). Linked to the palette, for example in a tag or list indexed by palette reference (e.g., a unique palette ID), is a natural language label or labels 22, with one or more natural language descriptions 23 of the palette. A term 24 associated with an emotion (the word "cheerful") is flagged. The label 22 can be considered to be any natural language information uniquely associated with the palette 10, such as the palette's title, comments by the palette's designer, comments by viewers, and the like. In the exemplary embodiment, there is no restriction on the label's content—i.e., labels 22 are mined for content which includes terms 24 of interest.

The exemplary system and method may make use of an existing dataset of color palettes 10 which have been manually annotated with natural language tags 22. The dataset may be retrieved from an online source, such as the colourlovers.com website. Such sites allow palette designers to post their palettes and have them reviewed by other online designers and users. Either the palette designer or the reviewer may annotate the palette with descriptive labels, some of which may include terms associated with one or more achromatic entities, such as emotions. While the following description of the exemplary embodiment focuses on the association between color palettes and emotions, it is to be appreciated that the system and method find application in connection with other achromatic entities.

In other embodiments, for example, in the case where there is an insufficient dataset of labelled palettes, for example, in the case of geographical regions, such as countries, a group of reviewers may be asked to review a collection of palettes and to each identify the palette or palettes which best evoke the countries France, Germany, USA, etc., for example.

Alternatively, the dataset may be generated by providing a collection of palettes of interest to a set of reviewers and asking them to assign an emotion or other type of entity to each one which, for them, the palette evokes.

Combinations of these methods may be employed for generating a dataset.

The method and system find application in a wide variety of color-related applications, such as enterprise marketing, variable data printing, photo finishing, and the like. For example, in the context of graphic design and creative services, where non-skilled users have to be assisted by semi-automatic tools in the creative part of publishing workflows, the suggestion of appropriate palettes could be advantageous. In the conception of simple visual products (e.g., brochures and flyers), for example, the choice of the correct palette is advantageous to achieving high aesthetic quality but it can also be a cumbersome task, which the present system and method can alleviate. The method and system may also find application in the field of computer vision and pattern recognition.

Figure 2:
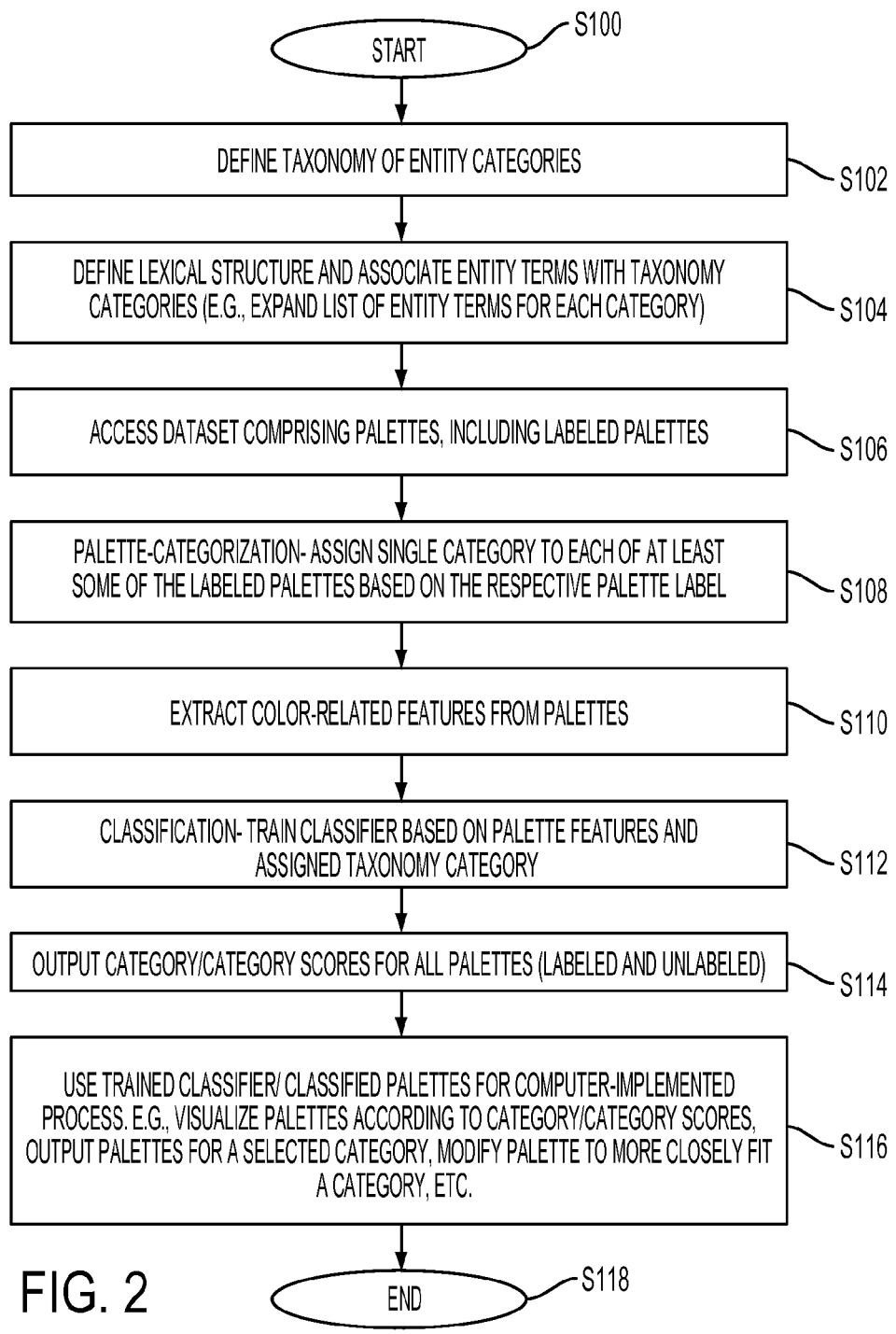
FIG. 2 is a flow chart illustrating a method for generating a palette classification system in accordance with one aspect of the exemplary embodiment.

FIG. 2 illustrates steps of the exemplary method. The method begins at S100.

At S102, a taxonomy is defined for the entity type of interest, e.g., emotions, geographical regions, music genres, etc. The taxonomy includes a set of entity categories (classes) into which terms describing such entity categories are assignable. The taxonomy may further define relationships between two or more categories. In the exemplary embodiment, each category corresponds to a broad category of emotion and is associated with a respective opposite category (e.g., pleasant vs. unpleasant).

At S104, a lexical structure for the taxonomy is defined. In this step, a lexical representation of the knowledge contained in the taxonomy is created. In one embodiment, S104 includes the population of the categories defined at S102 with natural language terms (words or multi-word expressions). The population can be performed manually or aided by lexical resources. In other embodiments, a procedure for assigning palettes to categories based on word scores may be adopted.

At S106, a dataset comprising labelled color palettes 10 is acquired.

At S108, terms 24 present in the lexical structure are extracted, where present, from the labels 22 of the palettes to generate a training dataset of palettes in which each palette may be associated (e.g., labelled) with one entity category corresponding to the term that is extracted from the natural language label of the palette and which matches one of the entities in the taxonomy.

At S110, color-related features are extracted from each color palette in the training dataset (e.g., chroma, luminance, harmony, contrast, etc).

At S112, a classifier is trained on the color-related features extracted from the color palettes and entity category labels.

At S114, the trained classifier may be applied to all palettes in the dataset. A category or a category score may be assigned to each color palette. This step may be performed using one or multiple classifiers trained with features of palettes. At this step, palettes which have no label corresponding to any term in the taxonomy can also be classified. For convenience, these are referred to as unlabeled palettes, although it is to be appreciated that they may have labels which have none of the taxonomy terms in them.

At S116, the trained classifier/classified palettes may be used in a computer-implemented process. In one embodiment, the palettes may be visualized, e.g., reordered accordingly to category scores.

The method ends at S118.

As will be appreciated, the steps of the method need not all proceed in the order illustrated and fewer, more, or different steps may be performed.

The method illustrated in FIG. 2 may be implemented in a computer program product that may be executed on a computer. The computer program product may be a computer-readable recording medium on which a control program is recorded, such as a disk, hard drive, or the like. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use. Alternatively, the method may be implemented in a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 2, can be used to implement the method.

Figure 3:
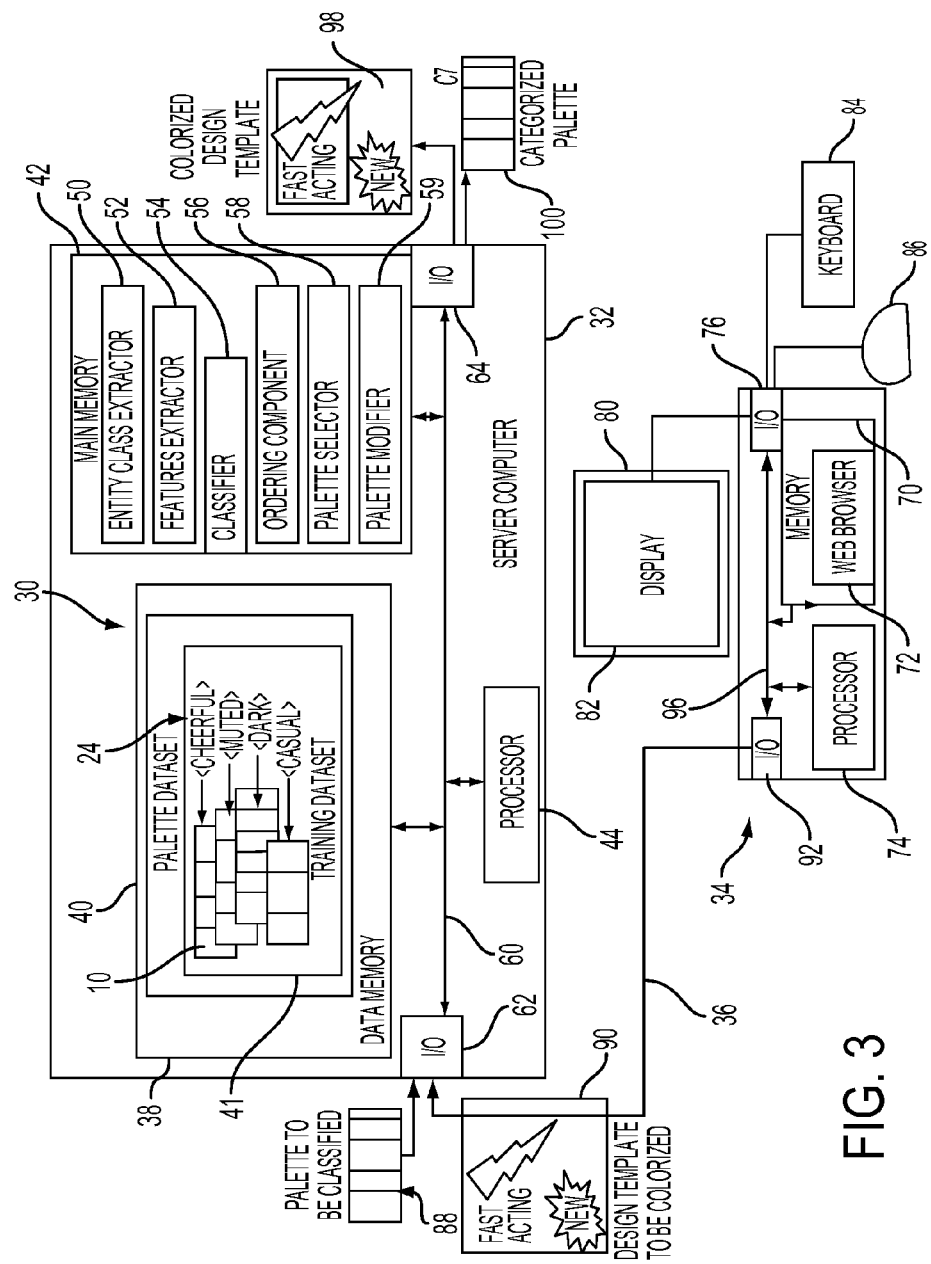
FIG. 3 illustrates a palette classification system in accordance with another aspect of the exemplary embodiment.

FIG. 3 illustrates a system 30 for associating color palettes with entities which may be used to implement the above-described method. The system 30 can be embodied in one or more computer device, such as a general purpose or dedicated computing device 32, e.g., a desktop computer, laptop computer, server, or the like. In the exemplary embodiment, the system is hosted by a server computer. The server computer 32 is communicatively linked to one or more user computers 34, such as the illustrated general purpose computer, via a wired or wireless link 36, such as a local area network, wide area network, such as the Internet. The system 30 includes data memory 38, which stores a dataset 40 of labelled color palettes, such as exemplary palette 10. The dataset may include a training dataset 41, including those palettes of the dataset which are labelled with recognized terms 24. Main memory 42, which may be separate from or integral with memory 38, stores software instructions for performing the exemplary method described above with reference to FIG. 2, and which are executed by an associated processor 44, such as the computer 32's CPU. However, the instructions can be in the form of software, hardware, or a combination thereof.

In particular, memory 42 stores an entity class extractor 50, a features extractor 52, a classifier 54, an ordering component 56, a color palette selector 58, and a color palette modifier 59. The entity class extractor 50 assigns an entity class (category) to each color palette 10 in the training dataset 41, based on one or more terms 24 extracted from the color palette's label 22. The class is selected from a set of classes $C=C_1, C_2, C_3 \ldots C_n$ where n is the number of classes. For convenience, color palettes which have fewer or more than one associated entity term 24 may be excluded from the training dataset 41. The features extractor 52 extracts color-related features from the color palettes in the dataset 40. The classifier 54 learns at least one classification model based on the color-related features extracted from the color palettes in the training dataset. The ordering component 56 outputs an order of a set of palettes along a dimension defined by opposing entity classes. The palette selector 58 chooses a palette from the categorized palette dataset 40 for colorizing a user-input document based on a user-selected emotion or other entity to be conveyed. The document may comprise a pattern to be colorized or may comprise a multi-colored image from which a palette is extracted based on predominant image colors forming a subset of the image colors. The color palette modifier 59 assesses the emotion (entity category) conveyed by a user-input color palette, as output by the classifier, and proposes modifications to the input palette to more closely match a user-selected emotion (entity category).

A data/control bus 60 communicatively links the components 38, 42, 44 of the system 30 to each other and to one or more input/output interfaces 62, 64.

Each user computer 34, etc. includes memory 70 which stores a web browser 72 for uploading color palettes and otherwise communicating with the system 30 and a processor 74, such as a CPU for operating the web browser and other software stored on the computer. An input/output interface 76 connects the computer 34 with a user interface 80, such as a graphical user interface (GUI). The user interface includes a display device 82, such as an LCD or plasma screen, computer monitor, or the like, and a user input device, such as a touch-screen, keyboard 84, cursor control device 86, microphone, or combination thereof. The user input device 84, 86 allows the user to interact with the GUI 80 to access the web browser 72, e.g., for uploading palettes 88 to the server for classifying, to initiate a request for palettes which are associated with a particular emotion or other type of entity, to request a palette for a document 90 to be colorized, such as a design template, or the like.

A network interface 92, such as a modem, allows the computer 34 to communicate with the server and/or other computer devices via the link 36.

The components 70, 74, 76, 92 of the computing device 10 may communicate via a data/control bus 94.

The computer 34 may be a PC, such as a desktop, a laptop, palmtop computer, portable digital assistant (PDA), cellular telephone, or other device with networking capability.

Memories 38, 42, 70 may represent any type of computer readable medium such as random access memory (RAM), read only memory (ROM), magnetic disk or tape, optical disk, flash memory, or holographic memory. In one embodiment, the memory 38, 42, 70 comprises a combination of random access memory and read only memory.

While the system 30 has been described in terms of a server computer 32 which stores both the dataset 40 and classifier model 54 and a user computer 34 interfacing with the server, it is to be appreciated that the components of the system 30 may be distributed over two or more computers. In other embodiments, some or all of the components of the system are hosted by the user's computer 34.

The term "software" as used herein is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

Further details of the system and method are now described.

Definition of the Taxonomy (S102):

In S102, a list of concepts or keywords in natural language which are relevant to describe the desired set of entities (e.g., emotions) is assembled. The choice of taxonomy should be appropriate to the entities that are to be modelled by the classifier. In particular, the taxonomy should be a good representation of reality (i.e., exhaustively represents all the possible categories of entities. The taxonomy should also conform to a multidimensional oriented space (e.g., two or more dimensions). This second feature it is particularly useful to define, for each category, an opposite category.

This step enables a list of terms which express each emotion to be defined, which can be expanded at S104. The terms are the basis of the lexicon that is used to annotate the color palettes.

In the specific context of emotions, a few taxonomies have been developed in cognitive psychology and used in many applications, in particular for music mood analysis. Some of them, like Thayer's mood model, are simple and effective with two axes indicating the amount of stress and energy respectively in the horizontal and vertical axis (see, R. Thayer. "The biopsychology of mood and arousal". Oxford University Press (1989)).

Figure 4:
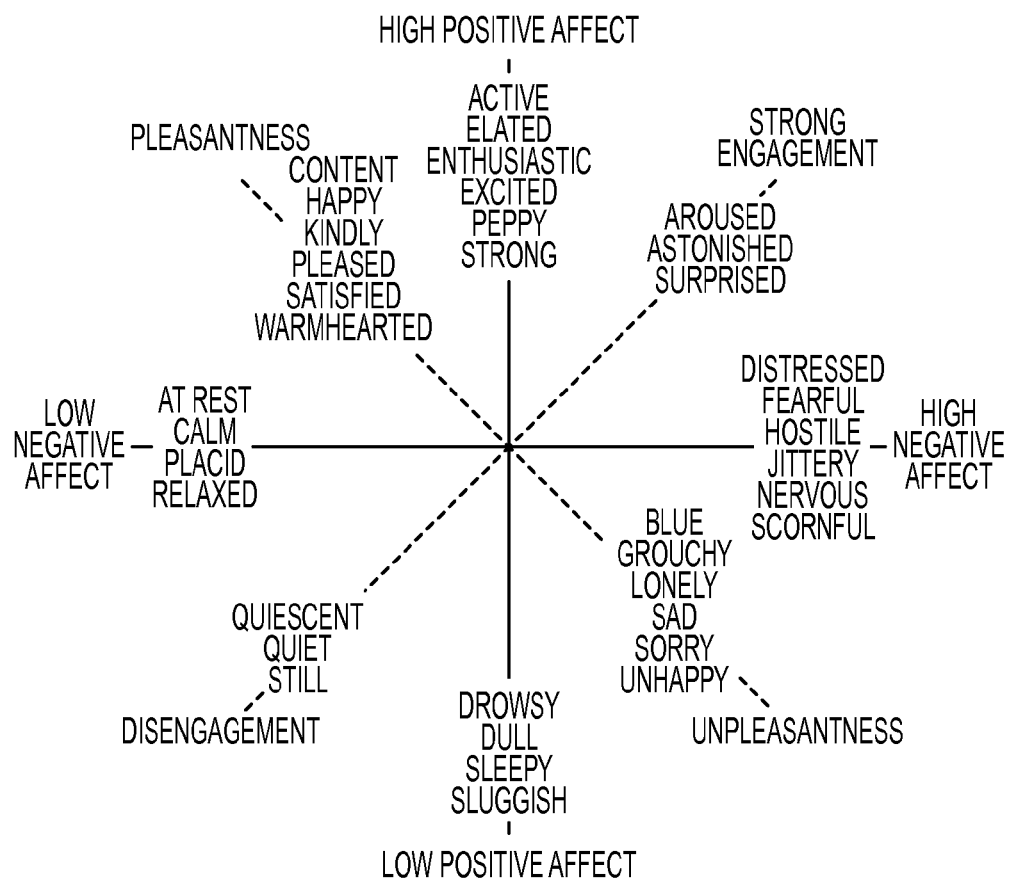
FIG. 4 illustrates an exemplary taxonomy for emotion entities—the Tellegen-Watson-Clark model of mood.

In the exemplary embodiment, the Tellegen-Watson-Clark mood model is employed (see, Tellegen, A., Watson, D. & Clark, L. A., "On the dimensional and hierarchical structure of affect," Psychological Science, Vol. 10, No. 4 (July 1999)). FIG. 4 reproduces the Tellegen-Watson-Clark mood model. The model contains eight different emotions (or moods) together with a limited set of associated terms. For example, the emotion category "High Positive Affect" is associated with the terms: active, elated, enthusiastic, excited, peppy, and strong. As can be seen, the various emotion categories are placed at the perimeter of a circle in direct opposition to their contrasting emotions. For instance, strong engagement emotions such as aroused, astonished, or surprise are opposed to quiescent, quiet, and still, which are typical disengagement emotions. The positive/negative affect is used as one dimension and the pleasantness/unpleasantness versus engagement/disengagement (45 degrees rotated) is used as the other.

While the exemplary embodiment employs eight categories of emotion, it is to be appreciated that fewer or more than eight entity categories may be employed, such as three, four, five, six, seven, nine, ten, or twelve categories, and optionally up to twenty or more categories may be employed.

For each achromatic entity category, there may be at least five or at least ten natural language terms. The number of natural language terms in each category can suitably be up to about a hundred or about fifty. In some embodiments, all (or at least a majority) of the terms are each uniquely associated with a respective one category. In other embodiments, terms are associated with multiple entity categories, with an associated weighting which reflects the confidence that the term is associated with that category.

Definition of the Lexical Structure (S104):

S104 includes the creation of a lexical representation of the knowledge contained in the taxonomy. The purpose of this step is to expand on the number of terms associated with each entity category.

This can be carried out manually by expanding the initial term list present in a mood model (e.g., the Tellegen-Watson-Clark model) using a thesaurus of related terms. Alternatively or additionally, a network-accessible electronic lexical resource is used to expand the initial term list. For example, synsets in an existing lexical resource (e.g., WordNet) which are representative of the entities populating the taxonomy may be mined. WordNet is an on-line lexical database for the English language. It groups English words into sets of synonyms (synsets), provides word definitions, and identifies the semantic relations between these synsets. (see, M. Marszalek and C. Schmid, "Semantic Hierarchies for Visual Object Recognition", CVPR 2007 for a description of the use of synsets for other applications). In the exemplary embodiment, each entity category in the taxonomy is associated with at least ten and in some cases, up to fifty or more terms, where each term is associated with only a single category.

Advantages of using a lexical resource with a predefined lexical hierarchy include:

1) the ability to extend the list of direct affective words (i.e., words directly referring to emotional states like fear, cheerful, etc.) with indirect affective words. Indirect affective words are words having only an indirect reference to the category that may depend on the context and/or that indicates possible emotional causes, such as "monster" or emotional responses, such as "cry".

2. The ability to evaluate a measure expressing the affective meaning of a generic term. The lexical structure incorporates relationships between different entities, associated with a topological distance.

In the context of emotions, relevant variants of WordNet, such as WordNet-Affect and/or SentiWordNet, may additionally or alternatively be employed for expanding the list of keywords. (See, Bernardo Magnini and Gabriela Cavaglià, "Integrating Subject Field Codes into WordNet," in Gavrilidou M., Crayannis G., Markantonatu S., Piperidis S. and Stainhaouer G. (Eds.) Proc. of LREC-2000, 2nd Int'l Conf. on Language Resources and Evaluation, Athens, Greece, pp. 1413-1418 (31 May-2 Jun., 2000); Luisa Bentivogli, Pamela Former, Bernardo Magnini and Emanuele Pianta, "Revising WordNet Domains Hierarchy: Semantics, Coverage, and Balancing," in Proc. of COLING 2004 Workshop on Multilingual Linguistic Resources, Geneva, Switzerland, pp. 101-108 (Aug. 28, 2004); and Andrea Esuli, Fabrizio Sebastiani, "SENTIWORDNET: A Publicly Available Lexical Resource for Opinion Mining," Proceedings of LREC-06, 5th Conference on Language Resources and Evaluation, Genova, IT, pp. 417-422 (2006)).

Both the WordNet-Affect and SentiWordNet lexical resources have been specifically designed to study the relation between natural language and affective information. The first is an extension of the WordNet database, and includes a subset of synsets suitable to represent affective concepts. In particular, the affective concepts representing emotional state are individuated by synsets marked with the a-label EMOTION. The second resource, SentiWordNet, is commonly applied for opinion mining tasks. It associates WordNet synsets to three numerical scores describing how objective, positive and negative the terms contained in the synsets are.

Three alternative methods are contemplated for defining the lexical structure, as follows:

A. This method may include manually creating for each affective class in the taxonomy (e.g., Tellegen-Watson-Clark model), a thesaurus of terms, e.g. as illustrated in Table 1. One Affective Class label can then be assigned to a palette if one or more terms of the thesaurus match the tags associated to the palette.

TABLE 1

Emotion Categories and Example Terms

| CATEGORY ID | AFFECTIVE CLASS | THESAURUS (example terms) |
|---|---|---|
| C1 | High positive affect | active, elated, enthusiastic, excited, peppy, strong |
| C2 | Strong engagement | Aroused, astonished, surprised |
| C3 | High negative affect | distressed, fearful, hostile, jittery, nervous, scornful |
| C4 | Unpleasantness | blue, grouchy, lonely, sad, sorry, unhappy |
| C5 | Low positive affect | drowsy, dull, sleepy, sluggish |
| C6 | Disengagement | quiescent, quiet, still |

TABLE 1-continued

Emotion Categories and Example Terms

| CATEGORY ID | AFFECTIVE CLASS | THESAURUS (example terms) |
|---|---|---|
| C7 | Low negative affect | rest, calm, placid, relaxed |
| C8 | Pleasantness | content, happy, kindly, pleased, satisfied, warm-hearted |

B. In this method, SentiWordNet (or other automated wordscoring system) is first used to obtain, for each palette, three scores (positive, objective, and negative) indicating affective information (the scores can be computed by simply averaging all the scores of the terms in each palette's label). One classification label among POSITIVE, NEGATIVE, OBJECTIVE is assigned to each palette according to a predetermined rule (e.g., majority rule).

C. In this method, WordNet-Affect (or other hierarchical labeling system) is used to match each tag associated with a palette against the 1314 synsets of WordNet-affect in order to retrieve the following features: 1. valence, 2. arousal, and 3. emotion. Then, these features are combined to generate a label from among the six basic emotions specified on WordNet-Affect and a confidence score. Specifically, a three dimensional feature space composed by valence, arousal, and emotion is defined. This space is partitioned into six regions corresponding to the six emotions specified on WordNet-Affect.

Dataset Creation (S106, S108):

Based on the lexicon, a training dataset 40 of palettes containing one category per palette is built using appropriate palettes.

In the exemplary embodiment, where the entity categories are each associated with a list of terms, user-generated palettes downloaded from a public website hosting a community of graphic designers and amateurs (S106) can be mined for the listed terms. For example, the colorlovers.com website provides access to more than 500,000 labeled palettes. Each palette is described by the sRGB values of each color swatch. sRGB is a standard RGB (Red Green Blue) color space created for use on monitors, printers, and the Internet. Other information, such as the number of viewers, viewer preferences, and tags in natural language (English in the illustrated embodiment) are associated to many of the palettes. In mining the dataset, palettes for which there is no clearly assignable category, e.g., because the label contains none of the listed terms of the taxonomy or because the label contains terms from two or more categories, can be discarded from the training dataset, although they may be classified once the classifier 54 has been developed.

Features Extraction (S110):

Features characterizing the palettes are extracted in an appropriate feature space. The features used may be selected so to capture the emotional valence of the palettes. The features can be computed using one or more different color spaces, e.g., perceptually uniform color spaces (e.g., L*a*b*, CIE, XYZ), additive color spaces (e.g., RGB, CMYK) or color spaces normally used in computer graphics (e.g., HSV, HLS). For each palette, at least one feature is extracted. As a first step, a palette descriptor is first defined which defines the set of colors in the palette. Then, from the descriptor, one or more features is extracted. One or more of the features may be dependent on the number N of swatches in the palette, while other(s) may be independent of the number of swatches. N, can be, for example, from about 2 to about 100.

In the exemplary embodiment, given a palette composed of N swatches (individual colors), where N is an integer which is at least 2 and generally, at least 3, the N colors are first converted to an appropriate working color space (if not already defined in that color space). An N×S dimensional palette descriptor is thus obtained, where S indicates the number of channels in the color space (usually S=3). For example, the palette descriptor may be in the form of a vector. As an example, assume that a given color palette has three color swatches which have color values (e.g., RGB, i.e., S=3) expressed in an 8 bit system of (0, 126, 214); (20, 130, 105); and (150, 120, 140), respectively. The palette descriptor is thus (0, 126, 214, 20, 130, 105, 150, 120, 140). In another embodiment, e.g., where the color values are in a 10 or 12 bit system, the color values may be discretized before generating the palette descriptor. For example, the possible range of color values may be partitioned into approximately equally sized bins and each color value then assigned an integer value for each channel which corresponds to a respective one of the bins.

Based on the palette descriptor, one or more features may be computed for each palette. In the exemplary embodiment, a plurality of features is computed for each palette, such as 2, 3, 4, or more features. As an example, features from one or more of the following feature sets are computed.

FEATURE SET 1: Features in this feature set are based on basic statistics that are computed on channel values, such as skewness, cross-correlation, mean, and standard deviation, minimum and maximum value of the various color channels. These features are independent of the value of N. Value histograms can also be considered. Thus, for example, for the example palette descriptor above, mean color values for each of the three channels may be determined as one feature: (57, 125, 153) with the average of the three channels, or the standard deviation of each channel (81, 5, 55).

FEATURE SET 2: Features in this set are based on Statistics on the distance between swatches are computed (also independent of N). This may be performed using one or more metrics adequate for the choice of color space. The basic statistics are applied to the distances between all swatches in a palette. For example, if the color space is perceptually uniform a simple Euclidean distance between color swatches can be evaluated on a color palette=(c1, c2, c3). The following features vector will be produced:

[Sqrt((red(c1)−red(c2))^2+(green(c1)−green (c2))^2+ (blue(c1)−blue (c2))^2)), Sqrt((red(c1)−red(c3))^2+ (green(c1)−green (c3))^2+(blue(c1)−blue (c3))^2)), Sqrt ((red(c2)−red(c3))^2+(green(c2)−green (c3))^2+(blue (c2)−blue (c3))^2))]

FEATURE SET 3: Raw features, without ordering. These can be the raw (or discretized) color values of the swatches, in the order specified by the designer (dependent on N). Thus, for the example palette, the feature may be its palette descriptor: (0, 126, 214, 20, 130, 105, 150, 120, 140).

FEATURE SET 4: Raw features, with ordering (dependent on N): These can be the raw (or discretized) color values of the swatches re-ordered by the value of a selected channel, e.g., luminance, hue, saturation, etc. Thus, for the example palette, the feature may be its reordered (according to RGB) palette descriptor: (0, 20, 150, 126, 130, 120, 214, 105, 140).

As will be appreciated, any combination of these or other feature types may be selected for characterizing the palettes.

A features representation, which characterizes the palette, can be generated, based on all the features extracted for a single palette. The features representation can be in the form of a features vector. The features vector can be generated by concatenating and optionally normalizing the features obtained from a single color space or multiple color spaces. Normalization of the features vector may be desirable when different scales are used. Redundancy can be reduced by applying classical feature selection or feature extraction techniques to reduce feature space while preserving descriptive power. For example, Principal Component Analysis (PCA) may be used to de-correlate the features and reduce dimensionality.

Classification (S112, S114):

At S112, a classifier model or set of classifier models is/are learned based on the features representation of each palette and the category assigned to the palette based on its label. In the exemplary embodiment (using the Tellegen-Watson-Clark model), a separate classifier model is trained for each pair of opposing emotions (e.g., pleasantness-unpleasantness), using the labeled dataset. The trained classifier models can subsequently be employed to label new color palettes (S114). A simple linear classifier, for example, can be used for classification with reasonable performance. The linear classifier may be a two-class classifier that decides class membership by comparing a linear combination of the extracted features to a threshold. As an example, a Naive Bayes classifier may be used. However, more complex classifiers may be employed, such as non-linear classifiers, e.g. kernel classifiers.

The classifier may include a multi-class pattern classifier which may then be trained using the extracted features and used to categorize the palettes in the desired affective categories. Statistical classifiers are particularly suited to this problem, due to their soft stochastic assignments. A probability score can be output for a palette for all categories or just for two (opposed) categories. For example, in the case of the opposed emotions pleasant-unpleasant, each palette classed in one of these two categories is accorded a pleasantness score in a pleasantness dimension and an unpleasantness score in an unpleasantness dimension, which can be converted to a single normalized score in the pleasantness-unpleasantness axis, e.g., a score between 0 and 1.

Figure 5:
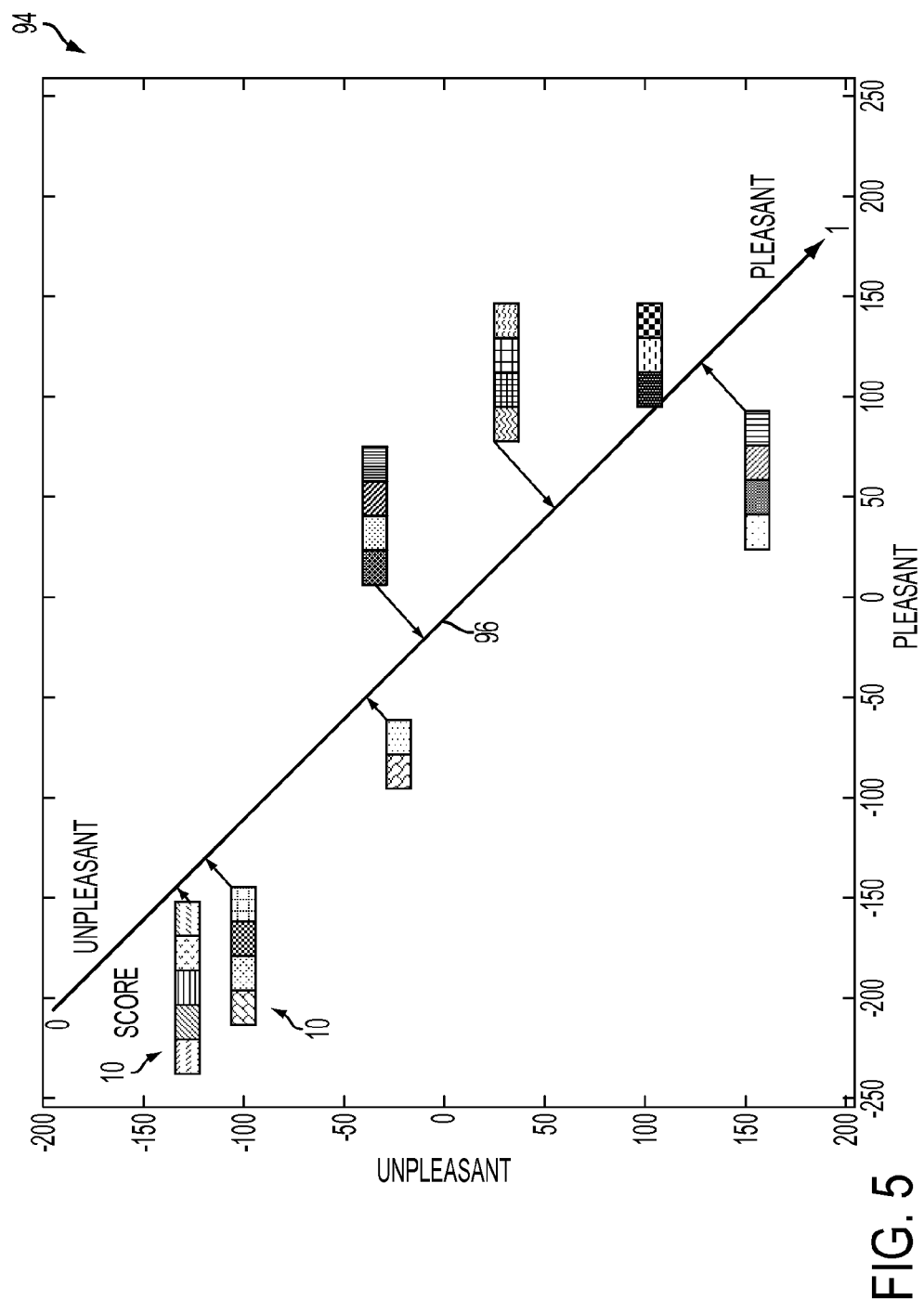
FIG. 5 illustrates a visualization of a dataset of palettes along a dimension defined by two entity classes.

Visualization and Other Implementations of the System (S116):

Depending on the application, the classified palettes/classifier can be used for a variety of uses. In one embodiment, multiple palettes are visualized in an emotion space for qualitative comparison. For example, a 2-D representation 94 of the palettes classified in two opposing categories is generated, with each palette 10 being displayed on an axis 96, as illustrated in FIG. 5. For illustrative purposes, only a small number of palettes are illustrated. It will be appreciated that fifty or one hundred or more palettes 10 may be arranged along the axis in some embodiments. For large numbers of palettes the palettes may be identified in the representation 94 by icons which can be clicked on to view a larger or complete version of the palette. The representation may be output from the server 32 and displayed on the user's computer display 82. The position of each palette is determined along the axis by its score. The score is based on the output of the classifier for the selected feature types. Scores close to zero indicate that the palette is highly correlated with one of the categories whereas a score close to 1 indicates the palette is highly correlated with the opposing category. Alternatively or additionally, a user may, for example, select to view all palettes which meet a threshold score, e.g., from 0.9 to 1 or from 0.1 to 0.

The system 30 can also be used to suggest a palette 10 for a given context. For example, a user submits a design template 90, such as a pattern or graphic which is to be colorized, and describes the emotion that the user wishes to convey (e.g., identifies one of the entity categories or suggests one or more terms). The system 30 selects a palette having sufficient swatches 12, 14, 16, etc. to meet the pattern 90 or designer's wishes and may display the palette and/or an automatically colorized version 98 of the design template. Alternatively, the user specifies an emotion and the system suggests a subset of the categorized palettes which best fit that emotion.

In other embodiments, the classifier 54 can dynamically output category probabilities as the designer proposes colors within a palette 10. For example as each new swatch is specified (by color values), the trained classifier updates the category probabilities for all categories, or just the scores for a user-selected pair of the categories. The user can see whether the developing palette is maintaining its association with a selected category.

In another embodiment, the system 30 can be used to evaluate a palette against a text document. Terms are extracted from the document in the same way as terms are extracted from the palette labels. The terms are input to the classifier model 54, which outputs a score for each category (or a best fit category). These score are compared to the category scores for the palette (or its best fit category). If the scores are close enough to be considered a match or if the assigned category of the document matches that of the palette, the palette is confirmed as being suitable for the document. Where multiple palettes are being considered, they can be ranked, based on how well they match the document.

The system and method find application in assisting users in the creation of multimedia-rich documents for direct marketing and variable data printing. In particular, variable document creation poses various challenges to the assurance of a proper aesthetical level due the portion of dynamic content that such documents include. One of them is how to treat visual aspects dynamically within the variable data workflow, so that the enhancement or management operations are handled in a more context sensitive fashion. The categorization of color palettes based on their emotions conveyed is applicable to these applications because it allows color palettes to be modified quickly and easily as the document content changes.

The system serves as a tool for associating color palettes to emotions or other achromatic entities which can support design activities other areas, such as image and document asset management, document image/photograph set visualization, photo album composition, packaging design, and the like.

Without intending to limit the scope of the exemplary embodiment, the following Example illustrates application of the method.

EXAMPLE

In the following example, the four proposed feature sets discussed above were evaluated for their ability to characterize a palette. While in the exemplary embodiment, features can be concatenated across feature sets, this was not found to be reflected in a significant improvement in performance. Moreover, while the first two feature sets are well suited for categorizing palettes with variable number of swatches, the second two are not. In the experiments conducted, only palettes with five swatches were used in order to be able to compare the performance between feature sets. A thesaurus of terms (analogous to that listed in Table 2) was used to generate a dataset of palettes annotated accordingly to the eight categories of the Tellegen-Watson-Clark model. The dataset contained a total number of 12781 palettes.

A 5-fold cross validation approach was used to train and test a simple linear categorizer using opposing emotions (e.g., Strong Engagement vs. Disengagement). Specifically, one fold (a fifth) of the dataset was used for training and the remaining ⅘ for evaluation for each fold. This also allowed a classification score to be associated to each palette. The score could then be used to position the palette along the axis whose dimension is defined by the two opposing emotions.

TABLE 2

Categories of Emotion and Example Keywords

| Category | Category name | Examples | | | |
|---|---|---|---|---|---|
| C1 | High Positive Affect | Active | Eager | Intense | Robust |
| | | Afire | Ecstatic | Jubilant | Solid |
| | | Aflame | Effective | Keen | Sharp |
| | | Animated | Energetic | Keyed up | Spicy |
| | | Beefy | Energized | Lively | Stalwart |
| | | Biting | Euphoric | Muscular | Stark |
| | | Brawny | Excited | Overjoyed | Staunch |
| | | Bright | Fervent | Passionate | Stout |
| | | Brilliant | Formidable | Peppy | Strong-tasting |
| | | Burly | Glaring | Persuasive | Sturdy |
| | | Compelling | Great | Potent | Thrilled Tough |
| | | Convincing | Hard-wearing | powerful | Vigorous |
| | | Dazzling | Heavy-duty | Physically | Weak |
| | | Dedicated | High | Persuasive | Well-built |
| | | Deep | Highly- | Piquant | Wholehearted |
| | | Delighted | flavoured | Pungent | Wound up |
| | | Durable | Hot | Resilient | |
| C2 | Strong Engagement | Amazed | Dazed | Produce | Surprise |
| | | Aroused | Dumbfounded | Provoke | Surprised |
| | | Astounded | flabbergasted | Rouse | staggered |
| | | Astonish | Gobsmacked | Sexy | Stimulate |
| | | Astonished | Incredulous | Shocked | Stir up |
| | | Awaken | Knocked for | Speechless | taken aback |
| | | Bewildered | six | startled | |
| | | bowled over | Overwhelmed | stunned | |
| C3 | High Negative Affect | A bundle of nerves | Bothered | Jumpy | Terrible |
| | | | derisive | Horrible | Terrified |
| | | Abysmal | Concerned | Hostile | Timid |
| | | Adverse | contemptuous | In pain | Tough |
| | | Afraid | Diredisdainful | Intimidating | Tormented |
| | | Aggressive | disrespectful | mocking | Troubled |
| | | Anguished | Distraught | Nervous | uneasy |
| | | Antagonistic | Distress | nervy | Unhappy |
| | | Anxious | Dreadful | On edge | Upset |
| | | Appalling | Edgy | panicky | Unfavorable |
| | | Apprehensive | Fearful | scornful | Unfriendly |
| | | Argumentative | Frightened | sneering | Unpleasant |
| | | | Frightful | Strung-up | Unreceptive |
| | | Atrocious | Harsh | Stressed out | Unsympathetic |
| | | Awful | Horrendous | Suffering | Unwelcoming |
| | | | Jittery | tense | Worried |
| C4 | Unpleasantness | abandoned | desolate | irritable | poor |
| | | alone | despondent | isolated | regretful |
| | | apologetic | discontented | lonely feeling | remote |
| | | bad-tempered | distressing | lonesome | remorseful |
| | | blue | down | lost | repentant |
| | | cantankerous | downcast | low | sad |
| | | cheerless | fed up | melancholic | secluded |
| | | complaining | friendless | melancholy | solitary |
| | | crabby | forlorn | moving | sorrowful |
| | | cut off | gloomy | miserable | sorry |
| | | dejected | grouchy | pathetic | testy |
| | | depressed | grumpy heart- | peevish | unhappy |
| | | depressing | rending | petulant | wretched |
| | | deserted | heartbreaking | pitiful | |
| C5 | Low Positive Affect | Blunt | Dreary | Listless | Slow-moving |
| | | Boring | Drowsy | Mind- | Slow-witted |
| | | Cloud | Dry | numbing | Slothful Sluggish |
| | | Cloudy | Dull | Monotonous | Snoozing |
| | | Dampen | Faded Grey | Muted | Somnolent |
| | | Dark | Gloomy | Nodding | Stultify |
| | | Deaden | Heavy-eyed | Obtuse | Stupid |
| | | Deadly | In a haze | Overcast | Tedious |
| | | Dense | Inactive | Peaceful | Thick |
| | | Dim | Insipid | Quiet | Tired |
| | | Dim-witted | Lackluster | Reduce | Unexciting |
| | | Dozy | Lethargic | Sleepy | Unintelligent |
| | | Dreamy | Lifeless | Slow | Uninteresting |
| C6 | Disengagement | at a halt | immobile | Quiescent | stagnant |
| | | at a standstill | Inactive | Quiet | static |

TABLE 2-continued

Categories of Emotion and Example Keywords

| Category | Category name | Examples | | | |
|---|---|---|---|---|---|
| | | at rest | Inert | quieten | Subtle |
| | | allay | motionless | Relaxed | subdue |
| | | banish | Muted | Restrained | Subdued |
| | | calm down | No noise | Serene | Tranquil |
| | | dispel | Peace and | Silence | Tranquility |
| | | Dormant | quiet | Silent | Understated |
| | | Gentle Hush | Peaceful | Soft | Uninterrupted |
| | | Hushed | Peace | Still | Undisturbed |
| | | | Placid | Stillness | unmoving |
| | | | | | Unobtrusive |
| C7 | Low Negative Affect | Break | Have a break | Peaceful | Rest |
| | | Breather | Have a rest | Placid | Serene |
| | | Calm | laid-back | Put your feet | stress-free |
| | | casual | Relaxation | up | Support |
| | | comfortable | Recreation | Quiet | Take a break |
| | | Composed | Lay | Relax | Take it easy |
| | | Docile | Lean | relaxed | Time-out |
| | | Easy-going | Lie | Remainder | undisturbed |
| | | Good-natured | Mild- | Respite | unperturbed |
| | | hassle-free | mannered | | |
| C8 | Pleasantness | affectionate | Compassion- | happy | Nicely |
| | | At ease | ately | Helpful | On cloud nine |
| | | Benevolent | Contented | Helpfully | Opportune |
| | | Benevolently | Contents | Humane | Please |
| | | Benign | Delighted | Humanely | Pleased |
| | | Benignly | demonstrative | In high spirits | Satisfied |
| | | Blissful | Exultant | Jovial | Substance |
| | | Caring | Favorable | Joyful | Sympathetic |
| | | Cheerful | Fortunate | Kind- | Sympathetically |
| | | Cheery | Fulfilled | heartedly | Thoughtful |
| | | Contented | Ecstatic | Kindly | Thoughtfully |
| | | Comfort | Gently | Lucky | Thrilled |
| | | Comfortable | Gist | Loving | warm |
| | | Compassion- | Glad | Make | warm-hearted |
| | | ate | Gratify | Nice | |

The results were evaluated in terms of classification accuracy and are shown in Table 3. Various features were tested using different color spaces (e.g., HSV, LAB, RGB). The best per-pair result was obtained with Feature Set 1, i.e., using simple statistics, which are also independent of the number of swatches. Simple image statistics like average hue, lightness or standard deviation on the same features were used as features. However, on average, the best result was obtained with Feature Set 4 in HSV color space. The best results (highest score) for each pair of categories are shown in bold. The score used was the score computed by the linear classifier.

TABLE 3

Classification results (classification accuracy) using the four feature sets with a linear classifier trained with opposing emotional categories.

| | | | Classification score | | | | |
|---|---|---|---|---|---|---|---|
| Feature Set | Feature type | Color space | High positive vs Low positive Affect | Strong Engagement vs Disengagement | High Negative vs Low Negative Affect | Unpleasantness vs Pleasantness | Ave. |
| 1 | Independent of N (# of colors) | RGB | 0.775 | 0.895 | 0.820 | 0.707 | 0.799 |
| | | HSV | 0.847 | 0.891 | 0.809 | 0.738 | 0.821 |
| | | LAB | 0.821 | 0.902 | 0.809 | 0.724 | 0.814 |
| 2 | Independent of N (colors distances) | RGB | 0.722 | 0.857 | 0.782 | 0.627 | 0.747 |
| | | HSV | 0.682 | 0.851 | 0.759 | 0.583 | 0.719 |
| | | LAB | 0.783 | 0.861 | 0.784 | 0.693 | 0.780 |
| 3 | Dependent on N (without order) | RGB | 0.773 | 0.895 | 0.813 | 0.671 | 0.788 |
| | | HSV | 0.851 | 0.886 | 0.798 | 0.722 | 0.814 |
| | | LAB | 0.781 | 0.894 | 0.814 | 0.687 | 0.794 |
| 4 | Dependent on N (with order) | RGB | 0.799 | 0.893 | 0.818 | 0.713 | 0.806 |
| | | HSV | 0.848 | 0.889 | 0.818 | 0.742 | 0.825 |
| | | LAB | 0.806 | 0.897 | 0.805 | 0.721 | 0.807 |

Ave. is the average (mean) of the four two-entity scores in the row.

For qualitative comparison, a 2-D representation of the palettes classified as Unpleasant and Pleasant (categories 4 and 8) was prepared, analogous to that illustrated in FIG. 5, but with many more palettes arranged along the Pleasant-Unpleasant axis 96. The position of each palette is determined along the axis by its score. Scores close to zero indicate unpleasantness whereas a score close to 1 indicate pleasantness.

EXEMPLARY APPLICATIONS

A: Automatic Color Scheme Picker

Documents rich in visual elements include images, graphic elements and text. In general, graphic designers decide which color palette/scheme to use based on a variety of factors: presence of a dominant color in the image to insert, emotional message to convey, harmonies, etc. The method presented herein can be applied to this problem.

The user provides a document template, an image such as a photograph to add, and an emotion E to convey (specified with a term listed in a pre-defined vocabulary). The dataset 40 of palettes categorized by emotion is utilized by the system 30 to output an appropriate palette or palettes that harmonizes well with the content of the image and it is correlated to the specified emotion. The following steps may be performed:

1. The colors in the image are segmented with a standard algorithm (e.g. K-means) and a color palette P is automatically generated by taking the K most dominant colors. (See, for example, U.S. Pat. Nos. 7,324,119, and 5,642,137 for exemplary methods for generating a palette from an image).

2. A set of appropriate palettes (most similar, most harmonious, etc.) are retrieved from an existing palette database using P as a query palette. Similarity can be determined, for example, by comparing the feature vector of the palette with feature vectors of the palettes in the database using any suitable distance metric, such as the Euclidean distance between feature vectors. Other distance metrics which may be used include the cosine of the angle between feature vectors, the Karhunen-Loeve distance, and the like.

3. Among the retrieved palettes, the ones indexed with emotion E are presented to the user for review.

4. The user selects the palette he or she prefers.

B: Assisted Palette Creation

The creation of a palette generally includes an ordered or unordered selection of various colors (color swatches). This selection process may have to fulfill several requirements which mainly concern the purpose for which the palette is created (e.g., colorize text and background, colorize graphic elements in a document, etc.) but may also be required to fulfill some aesthetic criteria or some cultural priors on color hues (e.g., green is often associated with relaxing, pleasant emotions, blue instead with cold, deep, etc).

The dataset of palettes categorized by emotion is utilized by the system to aid the user in picking colors. The method may proceed as follows:

1. The user selects a preliminary number of color swatches (e.g., three swatches).

The system 30 retrieves all the palettes containing similar colors (e.g., colors which fall within a predefined color value distance for each color channel) and it suggests additional swatches based on the identified palettes.

The user selects the most preferred swatches.

If the user wishes to modify the overall look and feel of the palette to convey an emotion, the user specifies the emotion he wants to convey (e.g., more exciting, much more relaxed, etc.).

The system retrieves a set of similar palettes satisfying the requirements.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of categorizing color palettes comprising:
associating natural language terms with achromatic entity categories of a set of achromatic entity categories;
mining a collection of color palettes which have been previously labeled with comments of reviewers to form a dataset of labeled color palettes;
assigning entity categories from the set of achromatic entity categories to a subset of the labeled color palettes in the dataset of color palettes based on matching natural language terms in the labels of the color palettes with the natural language terms associated with the achromatic entity categories, each color palette in the subset consisting of a sequence of from two to one hundred swatches, each swatch in the color palette being of a different color, each color palette in the dataset of color palettes differing from each of the other color palettes in the dataset with respect to at least one of its swatches;
extracting color-related features from each of the color palettes; and
with a computer processor and based on the assigned entity categories and color related features of the labeled color palettes, training a classifier to categorize a color palette into at least one of the set of achromatic entity categories based on its extracted color-related features.

2. The method of claim 1, wherein there are at least three achromatic entity categories.

3. The method of claim 1, wherein the achromatic entity categories comprise emotions.

4. The method of claim 3, wherein each emotion is paired with an opposite emotion, and wherein the classifier is trained to categorize a color palette along an axis defined by the two emotions in one of the pairs of the emotions.

5. The method of claim 1, wherein each of the achromatic entity categories is associated with a list of natural language terms.

6. The method of claim 5, wherein each natural language term is associated with only one achromatic entity category.

7. The method of claim 1, further comprising categorizing each of a set of unlabeled color palettes in the dataset of color palettes into at least one of the set of achromatic entity categories based on extracted color-related features of the unlabeled color palettes, the unlabeled color palettes lacking labels with natural language terms matching natural language natural language terms associated with the achromatic entity categories.

8. The method of claim 1, wherein the color-related features include at least one of the group consisting of features which are independent of a number of colors in each color palette, features which are dependent on the number of colors in each color palette, and combinations thereof.

9. The method of claim 8, wherein the color-related features include at least one feature which is dependent on the number of colors in each color palette.

10. The method of claim 1 wherein the extracting of color related features includes extracting the color-related features from a palette descriptor for each said color palette, the palette descriptor being based on color values for each of the colors in said color palette.

11. The method of claim 1, further comprising, generating a list of at least ten natural language terms for each of the achromatic entity categories.

12. The method of claim 1, further comprising, identifying a color palette from the dataset of color palettes for colorizing an input document based on a user-specified entity category.

13. The method of claim 12, wherein the document includes an image and the method further includes:
forming a color palette based on colors in the image; and
comparing the color palette to color palettes in the dataset to identify at least one similar palette categorized in the user-specified entity category.

14. A computer program product comprising a non-transitory recording medium encoding instructions, which when executed on a computer cause the computer to perform the method of claim 1.

15. A system comprising memory which stores instructions for performing the method of claim 1, and a processor, in communication with the memory for executing the instructions.

16. The method of claim 1, wherein there are up to 20 different colors in each of the color palettes.

17. A color palette system comprising:
a taxonomy stored in memory comprising a set of achromatic entity categories and a set of natural language terms associated with each of the achromatic entity categories;
a dataset of color palettes stored in memory, each color palette consisting of a sequence of from two to one hundred swatches, each of the swatches in the color palette being of a different color, each color palette in the dataset of color palettes differing from each of the other color palettes in the dataset with respect to at least one of its swatches, at least a subset of the color palettes being annotated with labels that each include at least one natural language term from the taxonomy;
a classifier stored in memory which assigns achromatic entity categories to color palettes, the classifier having been trained on color-related features extracted from labeled color palettes of the subset of the color palettes and achromatic entities assigned based on the natural language terms in their labels;
instructions stored in memory for inputting color-related features extracted from a color palette into the classifier and for associating at least one of the achromatic entity categories assigned by the classifier to said color palette;
an ordering component, stored in memory and executed by the processor which outputs an order of a set of palettes which are displayed along a dimension defined by a pair of opposing entity classes; and
a processor in communication with the memory which executes the instructions.

18. The system of claim 17, further comprising instructions for extracting color related features from the color palette.

19. The system of claim 17, further comprising:
a palette selector, stored in memory and executed by the processor which chooses a palette from the categorized dataset of color palettes for rendering a document, based on colors a user-selected entity category to be conveyed.

20. The system of claim 17, further comprising:
a palette modifier, stored in memory and executed by the processor which proposes modifications to a user-input color palette to more closely match a user-selected entity category.

21. The system of claim 17, further comprising:
a web browser for mining a collection of color palettes which have been previously labeled with comments of reviewers to form the dataset of labeled color palettes.

22. A method for palette classification comprising:
mining a collection of color palettes which have been manually annotated with descriptive labels to identify a training set of palettes with labels which include one of a predetermined set of natural language terms, the natural language terms in the set each being assigned to one of a set of achromatic entity categories, each of the palettes in the training set of palettes consisting of from two to one hundred swatches, each swatch in the color palette being of a visually different color, each color palette in the training set of color palettes differing from each of the other color palettes in the training set with respect to at least one of its swatches;
for each identified palette in the training set, generating a palette descriptor representing the colors in the palette;
with a computer processor, training a classifier with color-related features extracted from the palette descriptors and the achromatic entity categories of the terms included in the labels; and
classifying color palettes in the collection which are not in the training set with the classifier based on color-related features extracted from their respective palette descriptors.

23. The method of claim 22, wherein at least one of the features is dependent on a number of colors in each color palette.

24. The method of 22, wherein the generating a palette descriptor representing the colors in the palette comprises defining an N×S dimensional palette descriptor, where S is a number of channels in a color space, and N is the number of swatches in the color palette.

* * * * *